United States Patent Office 3,586,655
Patented June 22, 1971

3,586,655
USE OF N-(p-SUBSTITUTED AMINOPHENYL) PIPERIDINES IN RUBBERS
Kelly Farhat, Akron, Ohio, assignor to The Firestone Tire & Rubber Company, Akron, Ohio
No Drawing. Original application July 12, 1965, Ser. No. 471,409, now Patent No. 3,480,617, dated Nov. 25, 1969. Divided and this application Feb. 17, 1969, Ser. No. 856,506
Int. Cl. C08c *11/46*
U.S. Cl. 260—45.8N     7 Claims

ABSTRACT OF THE DISCLOSURE

N-(p-substituted aminophenyl) piperidines are antiozonants when used in rubbers.

---

This application is a division of my application Ser. No. 471,409 filed July 12, 1965 (now 3,480,617).

N-(p-substituted aminophenyl) piperidines are antiozonants when used in natural and synthetic rubbers and especially GR–S.

The piperidine derivatives are more effective in rubbers than the other compounds disclosed herein, and the invention includes the curing of rubbers in their presence, and the resulting rubbers.

Having the following formula are antiozonants:

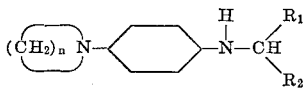

where $n$ is 4 to 6 and $R_1$ and $R_2$ are each from the class consisting of straight and branched chain and hydroxy alkyl groups of 1 to 10 carbon atoms and aryl groups of the class consisting of phenyl and naphthyl, and alkyl and alkoxy derivatives thereof in which the alkyl group is a lower straight or branched chain alkyl group of 1 to 4 carbon atoms; except that $R_1CHR_2$ may be a cycloalkyl group containing 5 to 8 carbon atoms. The preferred compounds for the protection of rubber vulcanizates are the piperidine derivaties in which $n$ is 5. They are preferred because of their greater effectiveness and less toxicity.

Representative compounds of the above formula are:

N-(p-isopropylaminophenyl) piperidine
N-[p-2(4-methylpentyl)aminophenyl] piperidine
N-(p-cyclohexylaminophenyl) piperidine
N-(p-2-octylaminophenyl) piperadine
N-[p-(α-phenylethyl)aminophenyl] piperidine
N-[p-(diphenylmethyl)aminophenyl] piperidine
N-(p-cyclopentylaminophenyl) piperidine
N-[p-2(4-hydroxy-4-methylpentyl)aminophenyl] piperidine
N-(p-cycloheptylaminophenyl) piperidine
N(p-isopropylaminophenyl) hexamethyleneimine
N(p-2-octylaminophenyl) hexamethyleneimine
N[p-2(4-methylpentyl)aminophenyl] hexamethyleneimine
N[p-2(4-hydroxy-4-methylpentyl)aminophenyl] hexamethyleneimine N(p-cyclohexylaminophenyl) hexamethyleneimine The compounds are advantageously prepared by reductive alkylation of the nitro-derivative of the appropriate ring compound with a ketone and hydrogen usually with a catalyst, e.g. platinum oxide. Usually room temperature will be used, but temperatures above and below may be employed.

The rubbers which are protected by these antiozonants are natural rubber and diene synthetic rubbers, i.e. homopolymers and copolymers of hydrocarbon dienes of 4 and 5 carbon atoms (viz. butadiene, isoprene and piperylene) and copolymers of such dienes with monomers such as styrene, alkyl-substituted styrnes, vinyl toluene, acrylonitrile, lower-alkyl acrylate and methacrylate esters.

The vulcanizates are prepared by adding to the rubber any usual amount of antiozonant together with rubber and other compounding ingredients and curing at any usual temperature.

The following examples are illustrative of the preparation of the antiozonants. The preparation of the nitro-intermediates is also described.

PREPARATION OF N-(4-NITROPHENYL) PYRROLIDINE

In a 1-liter round-bottom flask flted with a mechanical stirrer, a reflux condenser, and a thermometer was placed 158 gr. (1 mole) of 1-chloro-4-nitrobenzene and 256 gr. (3.6 moles) of pyrrolidine. The reaction mixture was stirred and heated cautiously by means of a heating mantle. When the temperature reached 60° C. (pot temperature) a vigorous reaction took place and the heating mantle was removed and external cooling was supplied. When the initial reaction subsided, the flask was cooled and the orange-yellow crystals were separated by filtration. The crystalline product was washed with water, then digested with warm methanol, cooled, filtered and air dried to yield 184.3 gr. of product; M.P. 169–171° C.

EXAMPLE 1

Preparation of N-(4-isopropylaminophenyl) pyrrolidine

The N-(4-nitrophenyl) pyrrolidine (9.61 gr., 0.05 mole), acetone (4.36 gr., 0.075 mole), glacial acetic acid (1 ml.), platinum oxide (200 mg.) and 100 ml. of absolute ethanol were mixed and hydrogenated on a Paar hydrogenator apparatus at an initial hydrogen pressure of 50 p.s.i.g. When the uptake of hydrogen had ceased, the reaction mixture was filtered to remove the catalyst and evaporated to dryness. The product was purified by chromatography on alumina and was a yellow oil.

*Analysis*—Calcd. for $C_{13}H_{20}N_2$ (percent): C, 76.80; H, 9.42; N, 13.78. Found (percent): C, 76.55; H, 10.00; N, 13.49.

EXAMPLE 2

Preparation of N-(p-cyclohexylaminophenyl) pyrrolidine

This product was prepared in the same manner as in Example 1 except that cyclohexanone was used in place of the acetone. The product was a colorless crystalline material melting at 83° C.

*Analysis*—Calcd. for $C_{16}H_{24}N_2$ (percent): C, 78.64; H, 9.89; N, 11.46. Found (percent): C, 78.88; H, 9.96; N, 11.36.

Preparation of N-(4-nitrophenyl) piperidine

In a 1-liter round-bottom flask fitted with a reflux condenser, a mechanical stirrer and a thermometer was placed 158 gr. (1 mole) of 1-chloro-4-nitrobenzene and 275 ml. (2.8 moles) of piperidine. The reaction mixture was heated at reflux for four hours, cooled and diluted with water and filtered. The solid product was washed thoroughly with water and dried at 80° C. The orange crystalline product melted at 102–104° C.

EXAMPLE 3

Preparation of N-(p-isopropylaminophenyl) piperidine

The N-(4-nitrophenyl) piperidine (10.3 gr., 0.05 mole), acetone (6.3 gr., 0.11 mole), glacial acetic acid (1 ml.), platinum oxide (0.1 gr.) and absolute ethanol (100 ml. were mixed and hydrogenated on a Paar hydrogenator apparatus at an initial hydrogen pressure of 50 p.s.i.g. When the uptake of hydrogen had ceased, the reaction mixture was filtered to remove the catalyst and evaporated to dryness. The product was purified by chromatography on alumina and was an oil.

Analysis.—Calcd. for $C_{14}H_{22}N_2$ (percent): C, 77.01; H, 10.16; N, 12.83. Found (percent): C, 76.50; H, 10.44; N, 12.05.

EXAMPLE 4

Preparation of N-[p-2-(4-methylphenyl)aminophenyl] piperidine

The reaction was carried out in the same manner as in Example 3 except that mesityl oxide was used in place of the acetone. The product was an oil and was purified by chromatography on alumina.

Analysis.—Calcd. for $C_{17}H_{28}N_2$ (percent): C, 78.40; H, 10.84; N, 10.76. Found (percent): C, 78.30; H, 10.73; N, 10.18.

EXAMPLE 5

Preparation of N-(p-cyclohexylaminophenyl) piperidine

This compound was prepared in the same manner as in Example 3 except that cyclohexanone was used in place of the acetone. The product after purification by chromatography on alumina melted at 40–41.5° C.

Analysis.—Calcd. for $C_{17}H_{26}N_2$ (percent): C, 79.02; H, 10.14; N, 10.84. Found (percent): C, 78.85; H, 10.15; N, 10.34.

Preparation of N-(p-nitrophenyl) hexamethyleneimine

In a 1-liter round-bottom flask fitted with a thermometer, a reflux condenser and a mechanical stirrer was placed 158 gr. (1 mole) of 1-chloro-4-nitrobenzene and 247 gr. (2.5 moles) of hexamethyleneimine. The reaction mixture was heated at reflux with stirring for four hours, diluted with water, cooled and filtered. The product was recrystallized from methanol and air dried. The bright yellow crystalline product melted at 76.2–77.0° C.

EXAMPLE 6

Preparation of N-(p-isopropylaminophenyl) hexamethyleneimine

The N-(p-nitrophenyl) hexamethyleneimine (11.0 gr., 0.05 mole), acetone (3.2 gr., 0.055 mole), glacial acetic acid (1 ml.), platinum oxide (0.02 gr.) and absolute ethanol (100 ml.) were mixed and hydrogenated on a Paar hydrogenator apparatus at an initial hydrogen pressure of 50 p.s.i.g. After the uptake of hydrogen had ceased, the reaction mixture was filtered and evaporated resulting in an oily product which was purified by chromatography on alumina.

Analysis.—Calcd. for $C_{15}H_{24}N_2$ (percent): C, 77.52; H, 10.41; N, 12.06. Found (percent): C, 77.35; H, 10.56; N, 11.63.

EXAMPLE 7

Preparation of N-(p-2-octylaminophenyl) hexamethyleneimine

This product was prepared in the same manner as shown in Example 6 except 2-octanone was used in place of acetone. The product was an oil and was purified by chromatography on alumina.

Analysis.—Calcd. for $C_{20}H_{34}N_2$ (percent): C, 79.41; H, 11.33; N, 9.26. Found (percent): C, 79.30; H, 11.18; N, 9.03.

EXAMPLE 8

Preparation of N-[p-2-(4-methylpentyl) aminophenyl] hexamethyleneimine

This product was prepared in the manner shown in Example 6 except mesityl oxide was used in place of acetone. The oily product was purified by chromatography on alumina.

Analysis.—Calcd. for $C_{18}H_{30}N_2$ (percent): C, 78.77; H, 11.02; N, 10.21. Found (percent): C, 78.85; H, 10.92; N, 10.00.

EXAMPLE 9

Preparation of N-[p-2-(4-hydroxy-4-methylphenyl) aminophenyl] hexamethyleneimine This product was prepared as shown in Example 6 except diacetone alcohol was used in place of the acetone. The oily product was purified by chromatography.

Analysis.—Calcd. for $C_{18}H_{30}N_2O$ (percent): C, 74.45; H, 10.42. Found (percent): C, 74.95; H, 10.13.

EXAMPLE 10

Preparation of N-(p-cyclohexylaminophenyl) hexamethyleneimine

This product was prepared in the manner shown in Example 6 except cyclohexanone was used in place of the acetone. The colorless crystalline product was recrystalized from petroleum ether (B.P. 30–60°) and melted at 50–51° C.

Analysis.—Calcd. for $C_{18}H_{28}N_2$ (percent): C, 79.35; H, 10.36; N, 10.29. Found (percent): C, 79.37; H, 10.20; N, 10.27.

Test samples were prepared in a usual formula for compounding GR–S (butadiene styrene copolymer) using 2 parts of each of several different antiozonants, and these were cured at 280° F. for 60 minutes. The following table shows that the vulcanizates had good properties, they stood up well on being subjected to oxidation in an oven 2 days at 212° F. Antiozonant test results are recorded, using this scale: very, very slight—(v.v sl.—), very, very slight (v.v. sl.), very slight (v. sl.), slight— (sl.—), slight (sl.), slight+(sl.+), moderate—, moderate and moderate+. The results show that although chemicals of these various classes have antiozonant value, the piperidine derivatives are unexpectedly superior to the compounds of the pyrrolidine and hexamethyleneimine series, and it is the use of these compounds only, in rubber, which is claimed herein. Furthermore, toxicity tests show the piperidine compounds to be less toxic than the corresponding pyrrolidine and hexamethyleneimine compounds, and they are safe for commercial use.

In the table, the compounds are identified as follows, the pyrrolidine and hexamethyleneimine compounds prepared in a similar manner being included to illustrate the small antiozonant effect of these similar compounds:

A—N(p-cyclohexylaminophenyl) pyrrolidine
B—N(p-isopropylaminophenyl) pyrrolidine
C—N(p-isopropylaminophenyl) hexamethyleneimine
D—N(p-cyclohexylaminophenol) hexamethyleneimine
E—N[p-2(4-methylpentyl)aminophenyl] piperidine
F—N(p-isopropylaminophenyl) piperidine
G—N(p-cyclohexylaminophenyl) piperidine The following table gives the test results.

| Antiozonant | A | B | C | D | E | F | G | Blank |
|---|---|---|---|---|---|---|---|---|
| Physical properties: | | | | | | | | |
| Before aging: | | | | | | | | |
| 300% modulus, p.s.i. | 1,025 | 900 | 1,225 | 1,250 | 1,425 | 1,275 | 1,300 | 1,600 |
| 400% modulus, p.s.i. | 1,450 | 1,450 | 1,850 | 1,875 | 2,175 | 1,275 | 2,025 | 2,450 |
| Tensile strength, p.s.i. | 3,100 | 3,375 | 3,400 | 3,500 | 3,750 | 3,375 | 3,600 | 3,200 |
| Elongation, percent | 680 | 740 | 640 | 660 | 580 | 620 | 610 | 490 |
| After aging: | | | | | | | | |
| 300% modulus, p.s.i. | 1,750 | 1,830 | 2,025 | 2,100 | 2,425 | 2,575 | 2,400 | |
| Tensile strength, p.s.i. | 3,300 | 3,325 | 3,250 | 3,275 | 2,850 | 3,075 | 2,400 | 2,150 |
| Elongation, percent | 490 | 490 | 440 | 440 | 340 | 340 | 300 | 280 |
| Ozone cracking | Sl. | Sl.+ | Sl.+ | Sl. | V.v. Sl.− | V.v. sl.− | V. sl.− | Mod. |

What is claimed is:

1. A composition which contains a rubber vulcanizate and an antiozonant of the formula

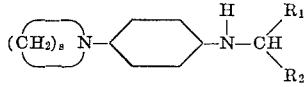

in which $R_1$ and $R_2$ are each from the class consisting of straight and branched chain and hydroxy alkyl groups of 1 to 10 carbon atoms and aryl groups of the class consisting of phenyl and naphthyl and alkyl and alkoxy derivatives thereof in which the alkyl group is a lower straight or branched chain alkyl group of 1 to 4 carbon atoms, except that $R_1CHR_2$ may be a cycloalkyl group containing 5 to 8 carbon atoms, the rubber being from the class consisting of natural rubber and diene synthetic rubbers.

2. The composition of claim 1 in which the rubber is GR–S.

3. The composition of claim 1 in which the antiozonant is N-(p-isopropylaminophenyl) piperidine.

4. The composition of claim 1 in which the antiozonant is N-(p-cyclohexylaminophenyl) piperidine.

5. The composition of claim 1 in which the antiozonant is N-[p-2-(4-methylpentyl)aminophenyl] piperidine.

6. The composition of claim 1 in which the rubber vulcanizate is a vulcanizate of butadiene-styrene copolymer.

7. The composition of a vulcanizate of a rubber which is a butadiene-styrene copolymer and an N-(p-secondary alkylaminophenyl) piperidine in which the alkyl group contains 1 to 10 carbon atoms.

References Cited

UNITED STATES PATENTS

| | | | |
|---|---|---|---|
| 1,899,058 | 2/1933 | Reed | 260—800 |
| 2,324,056 | 7/1943 | Barton | 260—800 |
| 2,861,975 | 11/1958 | Thompson | 260—45.8 |
| 3,163,616 | 12/1964 | Stahly | 260—28.5 |
| 3,480,617 | 11/1969 | Farhat | 260—239 |

DONALD E. CZAJA, Primary Examiner

R. A. WHITE, Assistant Examiner

U.S. Cl. X.R.

260—800

PO-1050
(5/69)

UNITED STATES PATENT OFFICE
CERTIFICATE OF CORRECTION

Patent No. __3,586,655__  Dated __June 22, 1971__

Inventor(s) __Kelly Farhat__

It is certified that error appears in the above-identified patent and that said Letters Patent are hereby corrected as shown below:

Col. 1, line 28 should read:
"Compounds having the following formula are antiozonants:

Col. 2, line 13, "styrnes" should read --styrenes--

Col. 3, line 29, "(4-methylphenyl)" should read --(4-methylpentyl)-- line 66, "(0.02 gr.)" should read --(0.20 gr.) --

Col. 4, line 25, "methylphenyl" should read --methylpentyl--

Col. 5, line 17, "$(CH_2)_s$" should read --$(CH_2)_5$ --

Signed and sealed this 2nd day of November 1971.

(SEAL)
Attest:

EDWARD M. FLETCHER, JR.
Attesting Officer

ROBERT GOTTSCHALK
Acting Commissioner of Patents